US011576164B2

(12) United States Patent
Nam et al.

(10) Patent No.: US 11,576,164 B2
(45) Date of Patent: Feb. 7, 2023

(54) DYNAMIC SLOT FORMAT INDICATOR CONFIGURATION

(71) Applicant: QUALCOMM Incorporated, San Diego, CA (US)

(72) Inventors: Wooseok Nam, San Diego, CA (US); Jing Sun, San Diego, CA (US); Tao Luo, San Diego, CA (US); Xiaoxia Zhang, San Diego, CA (US); Zhifei Fan, San Diego, CA (US); Srinivas Yerramalli, San Diego, CA (US); Sungwoo Park, San Diego, CA (US); Akula Reddy, San Diego, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 16/948,899

(22) Filed: Oct. 5, 2020

(65) Prior Publication Data

US 2021/0136734 A1    May 6, 2021

Related U.S. Application Data

(60) Provisional application No. 62/929,443, filed on Nov. 1, 2019.

(51) Int. Cl.
*H04W 4/00* (2018.01)
*H04W 72/04* (2009.01)

(52) U.S. Cl.
CPC ..... *H04W 72/042* (2013.01); *H04W 72/0446* (2013.01)

(58) Field of Classification Search
CPC .......... H04W 72/042; H04W 72/0446; H04W 48/16; H04W 48/12
See application file for complete search history.

(56) References Cited

U.S. PATENT DOCUMENTS 11,089,585 B2 *   8/2021   Xu .................. H04L 5/0032
11,184,140 B2 *   11/2021  Zhou .............. H04L 1/1896
(Continued)

FOREIGN PATENT DOCUMENTS

WO     2018145019 A1    8/2018

OTHER PUBLICATIONS

3GPP TS 38.213: "3rd Generation Partnership Project; Technical Specification Group Radio Access Network; NR; Physical Layer Procedures for Control (Release 15)", 3GPP Standard; Technical Specification; 3rd Generation Partnership Project (3GPP), Mobile Competence Centre; 650, Route Des Lucioles; F-06921 Sophia-Antipolis Cedex; France, vol. RAN WG1, No. V15.1.0, Apr. 8, 2018, pp. 1-76, XP051451088, [retrieved on Apr. 8, 2018] section 1 "Scope" section 8 "Random Access Procedure", p. 60, paragraph 11.1.1.

(Continued)

*Primary Examiner* — Abdelnabi O Musa
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station (BS), an indication of a plurality of sets of slot format indicator parameters. The UE may receive, from the BS, a communication that identifies a set of slot format indicator parameters from the plurality of sets of slot format indicator parameters. Numerous other aspects are provided.

30 Claims, 14 Drawing Sheets

(56) References Cited

U.S. PATENT DOCUMENTS

| | | | |
|---|---|---|---|
| 11,252,721 B2* | 2/2022 | Cai | H04W 4/08 |
| 2019/0141546 A1* | 5/2019 | Zhou | H04W 72/0453 |
| 2019/0349904 A1* | 11/2019 | Kwak | H04L 5/0048 |
| 2020/0178350 A1* | 6/2020 | Miao | H04W 56/0015 |
| 2021/0051672 A1* | 2/2021 | Rastegardoost | H04W 72/0493 |
| 2021/0360698 A1* | 11/2021 | Xu | H04W 74/0816 |
| 2022/0022248 A1* | 1/2022 | Kwak | H04W 74/0808 |
| 2022/0191882 A1* | 6/2022 | Lee | H04W 72/10 |

OTHER PUBLICATIONS

CATT: "Remaining Design Aspects of Slot Format Indication", 3GPP TSG RAN WG1 Meeting #90bis, 3GPP Draft; R1-1717824, 3rd Generation Partnership Project (3GPP), Mobile Competence Centre; 650, Route Des Lucioles; F-06921 Sophia-Antipolis Cedex; France, vol. RAN WG1, No. Prague, Czechia; Oct. 9, 2017-Oct. 13, 2017, 6 Pages, Oct. 8, 2017 (Oct. 8, 2017), XP051341009, Retrieved from the Internet: URL: http://www.3gpp.org/ftp/Meetings_3GPP_SYNC/RAN1/Docs/ [retrieved on Oct. 8, 2017] the whole document.

International Search Report and Written Opinion—PCT/US2020/070622—ISA/EPO—dated Feb. 11, 2021.

* cited by examiner

DYNAMIC SLOT FORMAT INDICATOR CONFIGURATION

CROSS-REFERENCE TO RELATED APPLICATION

This Patent Application claims priority to U.S. Provisional Patent Application No. 62/929,443, filed on Nov. 1, 2019, entitled "DYNAMIC SLOT FORMAT INDICATOR CONFIGURATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for dynamic slot format indicator configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving, from a base station (BS), an indication of a plurality of sets of slot format indicator parameters; and receiving, from the BS, a communication that identifies a set of slot format indicator parameters from the plurality of sets of slot format indicator parameters.

In some aspects, a method of wireless communication, performed by a BS, may include transmitting, to a UE, an indication of a plurality of sets of slot format indicator parameters; and transmitting, to the UE, a communication that identifies a set of slot format indicator parameters from the plurality of sets of slot format indicator parameters.

In some aspects, a UE for wireless communication may include memory and one or more processors operatively coupled to the memory. The memory and the one or more processors may be configured to receive, from a BS, an indication of a plurality of sets of slot format indicator parameters; and receive, from the BS, a communication that identifies a set of slot format indicator parameters from the plurality of sets of slot format indicator parameters.

In some aspects, a BS for wireless communication may include memory and one or more processors operatively coupled to the memory. The memory and the one or more processors may be configured to transmit, to a UE, an indication of a plurality of sets of slot format indicator parameters; and transmit, to the UE, a communication that identifies a set of slot format indicator parameters from the plurality of sets of slot format indicator parameters.

In some aspects, a non-transitory computer-readable medium may store one or more instructions for wireless communication. The one or more instructions, when executed by one or more processors of a UE, may cause the one or more processors to: receive, from a BS, an indication of a plurality of sets of slot format indicator parameters; and receive, from the BS, a communication that identifies a set of slot format indicator parameters from the plurality of sets of slot format indicator parameters.

In some aspects, a non-transitory computer-readable medium may store one or more instructions for wireless communication. The one or more instructions, when executed by one or more processors of a BS, may cause the one or more processors to: transmit, to a UE, an indication of a plurality of sets of slot format indicator parameters; and transmit, to the UE, a communication that identifies a set of slot format indicator parameters from the plurality of sets of slot format indicator parameters.

In some aspects, an apparatus for wireless communication may include means for receiving, from a BS, an indication of a plurality of sets of slot format indicator parameters; and means for receiving, from the BS, a communication that identifies a set of slot format indicator parameters from the plurality of sets of slot format indicator parameters.

In some aspects, an apparatus for wireless communication may include means for transmitting, to a UE, an indication of a plurality of sets of slot format indicator parameters; and means for transmitting, to the UE, a communication that identifies a set of slot format indicator parameters from the plurality of sets of slot format indicator parameters.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
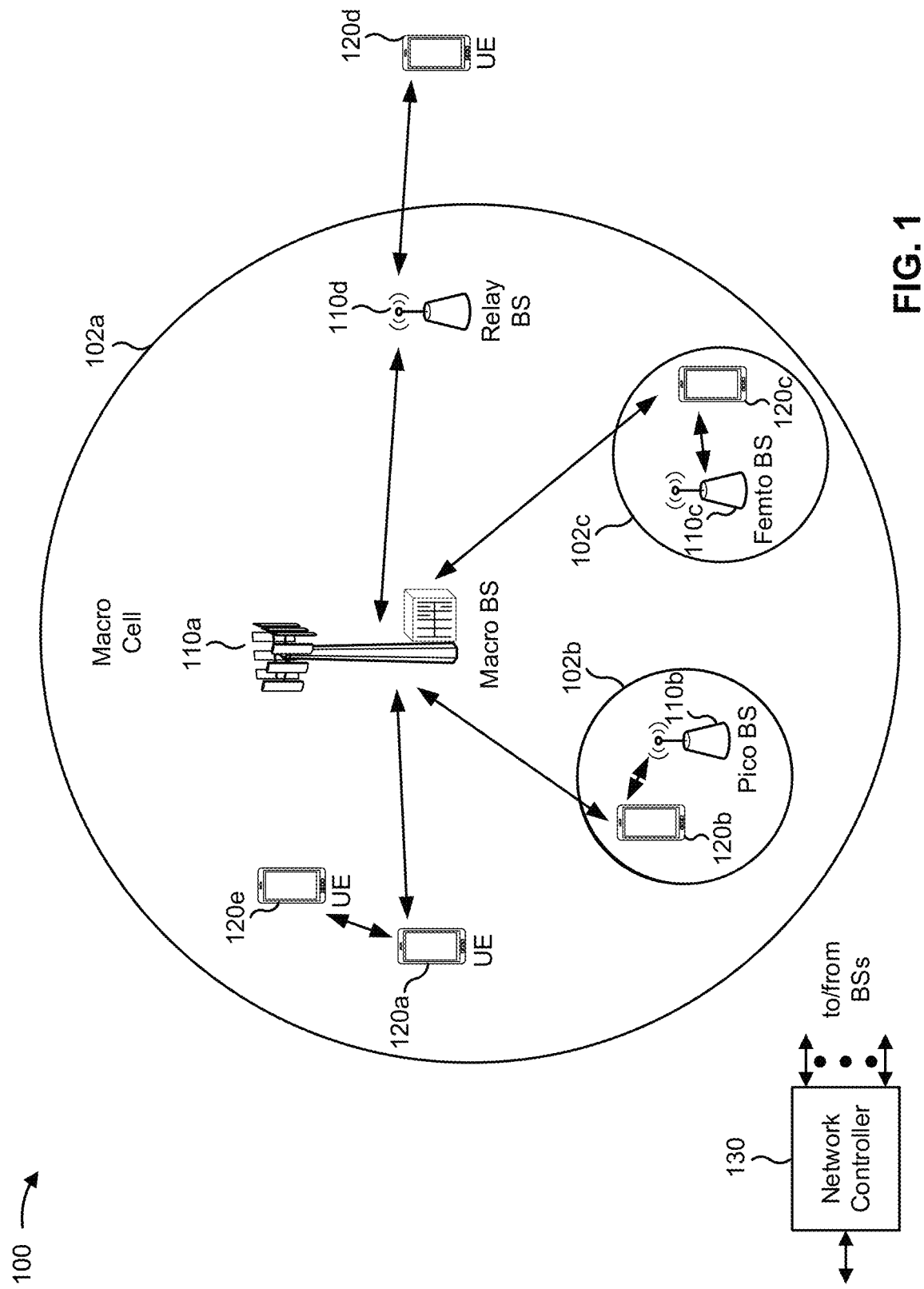
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
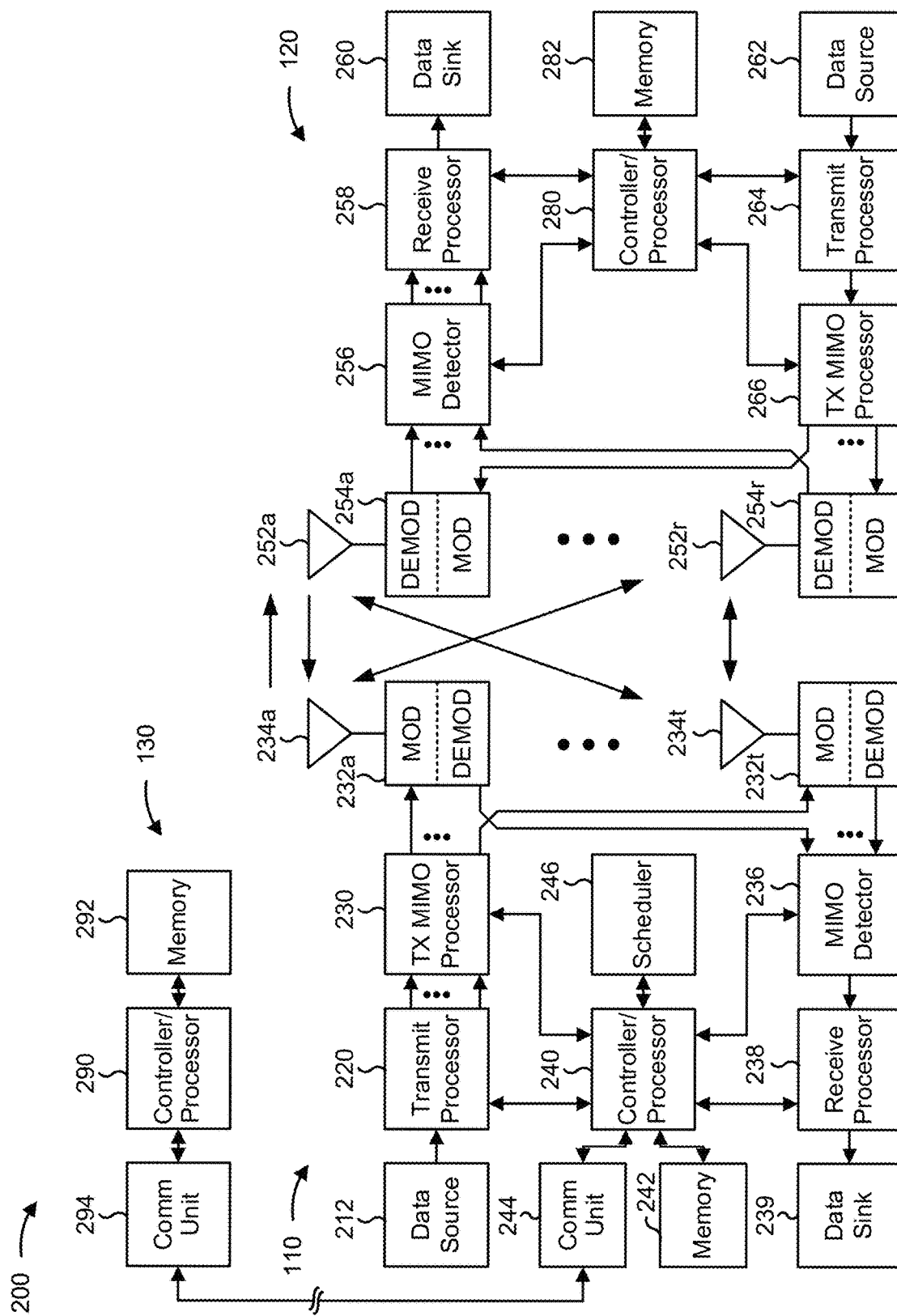
FIG. 2 is a block diagram illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with dynamic slot format indicator configuration, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6, process 700 of FIG. 7, and/or other processes as described herein. A scheduler 246 may schedule UEs for data transmission on the downlink and/or uplink.

In some aspects, UE 120 may include means for receiving, from a BS 110, an indication of a plurality of sets of slot format indicator parameters, means for receiving, from the BS 110, a communication that identifies a set of slot format indicator parameters from the plurality of sets of slot format indicator parameters, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE 120, an indication of a plurality of sets of slot format indicator parameters, means for transmitting, to the UE 120, a communication that identifies a set of slot format indicator parameters from the plurality of sets of slot format indicator parameters, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3A:
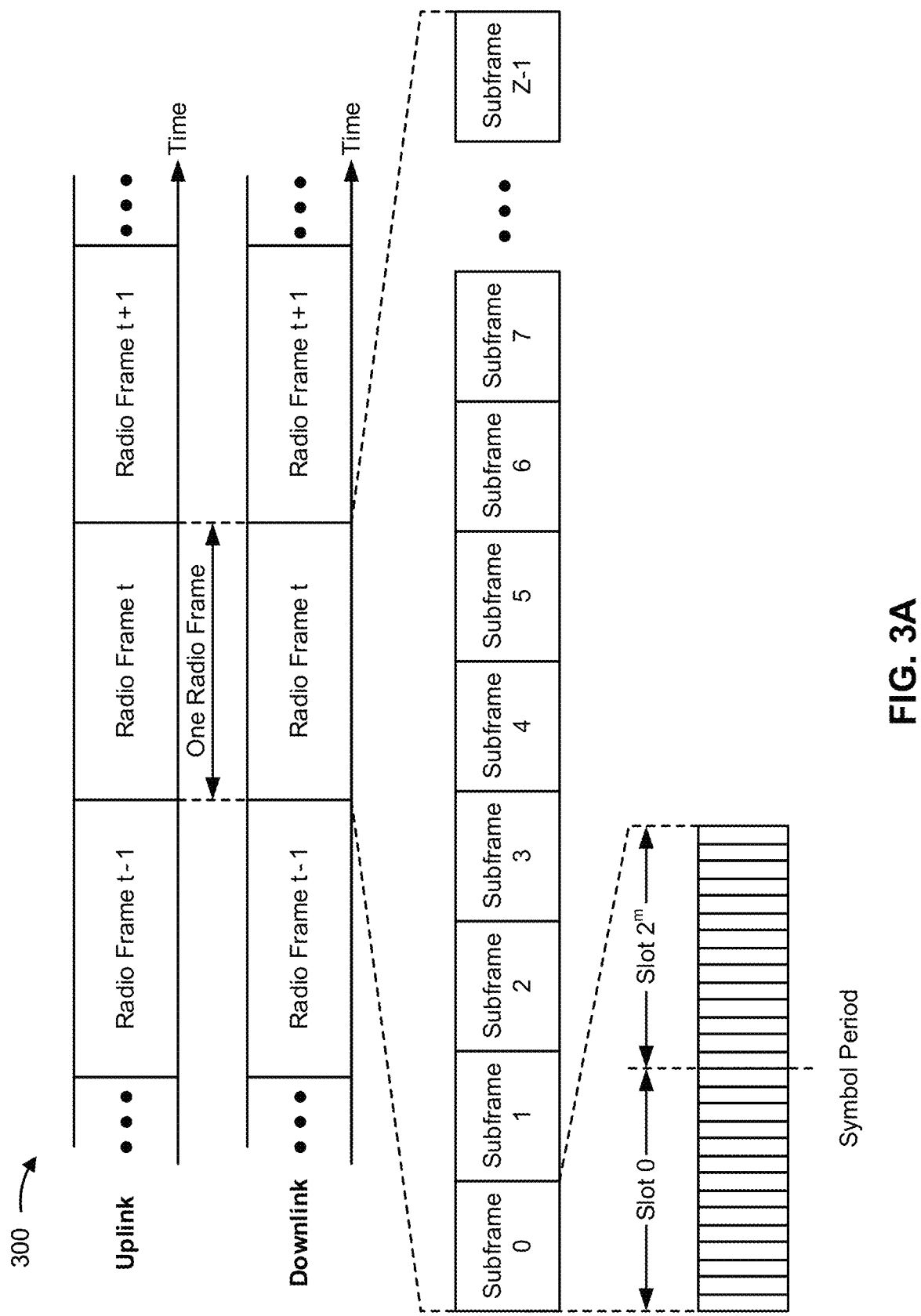
FIG. 3A is a block diagram illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2 L symbol periods, where the 2 L symbol periods in each subframe may be assigned indices of 0 through 2 L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
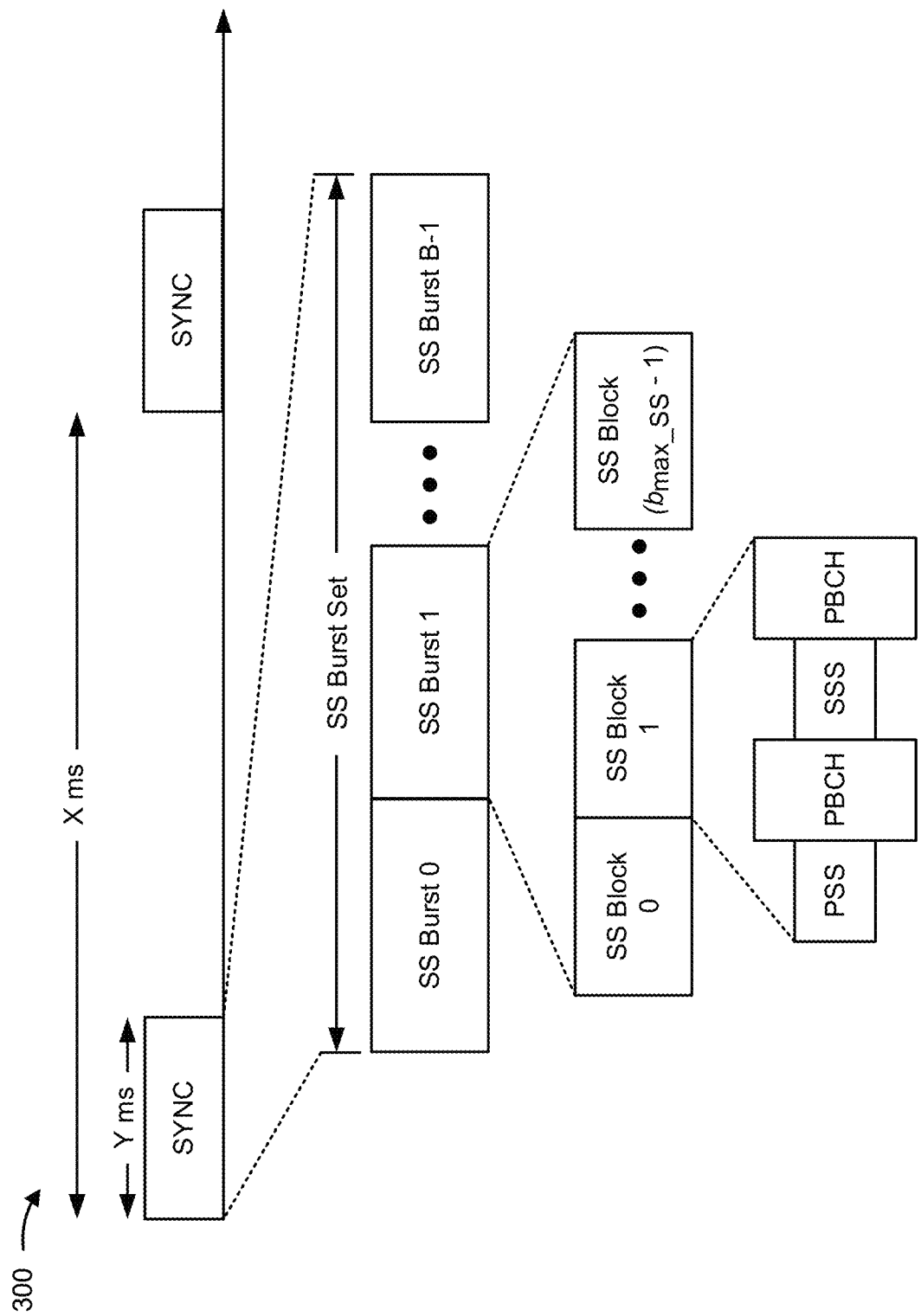
FIG. 3B is a block diagram illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
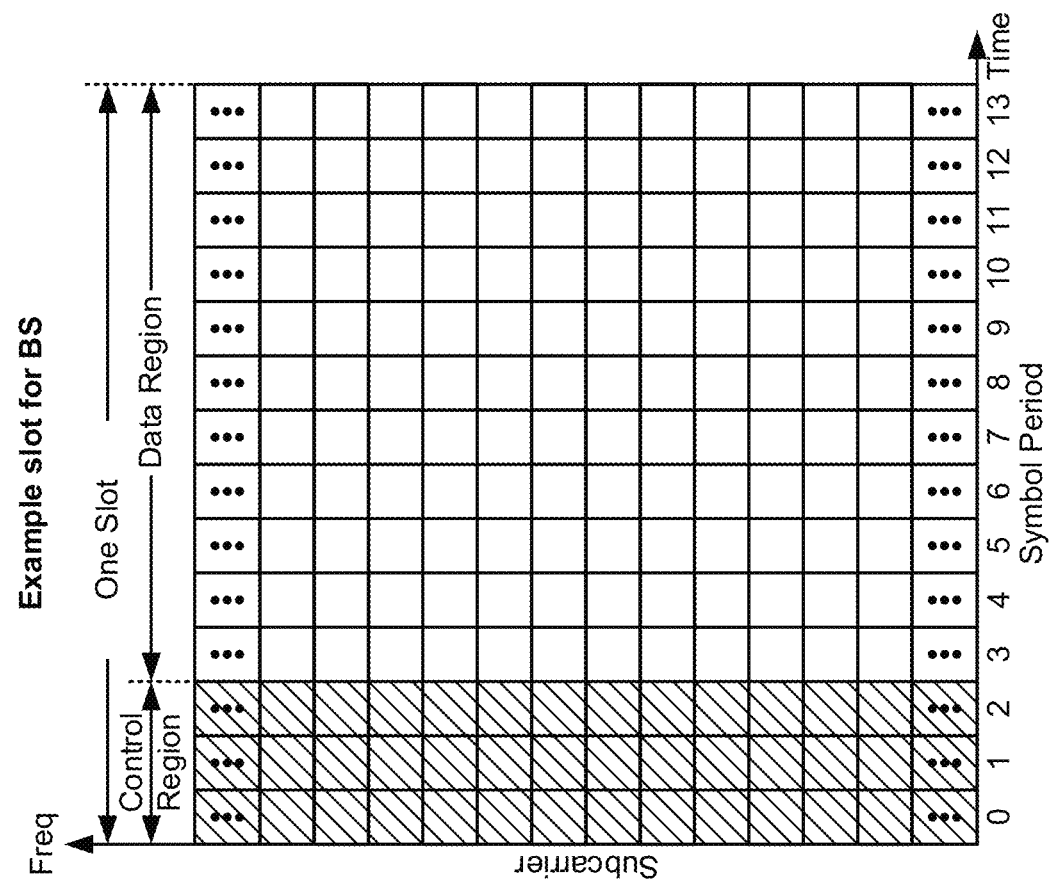
FIG. 4 is a block diagram illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

In some cases, a BS (e.g., BS 110) may dynamically configure a slot format (e.g., a slot 410 and/or another slot format) for one or more UEs (e.g., UEs 120). For example, the BS may transmit a PDCCH communication to the UE (or a group common PDCCH (GC-PDCCH) communication to a group or plurality of UEs) to indicate a slot format indicator index to the UE. The UE may identify the slot format indicator index, in downlink control information (DCI) included in the PDCCH communication, configured for a serving cell in which the UE is located. The UE may perform a look-up in a slot format combination (SFC) table to identify a slot format indicator associated with a combination of the slot format indicator index and a slot index. The UE may perform a look-up in a slot format table to identify the slot format, associated with the slot format indicator, for a slot associated with the slot index.

The slot format may identify a configuration for each symbol included in the slot. For example, if the slot includes 14 symbols, the slot format may identify whether each symbol is configured for downlink communication, uplink communication, or may be flexibly configured by the BS. Accordingly, the UE may communicate with the BS based at least in part on the slot format by receiving downlink communications in symbols configured for downlink communication, by transmitting uplink communications in symbols configured for uplink communication, and/or by refraining from receiving or transmitting (e.g., which may provide some power saving for the UE) in flexible symbols (e.g., unless the flexible symbols are further configured for uplink communication or downlink communication in a dynamic slot configuration). In some aspects, a slot format may further identify symbols that may be used by the UE for sidelink communication and/or other types of communication.

In some cases, such as in millimeter wave (mmWave) wireless networks, communication between a UE and a BS may be based at least in part on beam-paired links (e.g., links that include a paired UE receive beam and BS transmit beam). In this case, a slot format indicator index may be transmitted with beamforming. For example, the BS may transmit a slot format indicator index to the UE and other UEs on one or more beams with repetition in a time division multiplexed manner (e.g., beam sweeping). In this case, the same slot format indicator index is transmitted in different spatial directions, which may be determined by the combined traffic status of the UE and the other UEs. If there is no UE with active traffic in a certain spatial direction, the BS may not transmit the slot format indicator index on the beam corresponding to the spatial direction. Accordingly, a UE without any active traffic may not receive a slot format indicator index, which permits the UE to refrain from transmitting and receiving communications (e.g., for power saving purposes). However, if the UE without any active traffic is not in the intended spatial directions of the beams and unintentionally receives a slot format indicator index due to side-lobe or back-lobe leakage on the beams, the UE may be unable to save power due to being inadvertently configured with a slot format.

In another example, the BS may transmit different slot format indicator indexes across a plurality of beams simultaneously such that the slot format indicator indexes are spatial division multiplexed for purposes of multi-user MIMO. However, if the slot format indicator indexes are transmitted using the same resources across the plurality of beams (e.g., transmitted in the same time-domain resources and/or frequency-domain resources, scrambled with the same radio network temporary identifier (RNTI), and/or the like), a UE may receive a plurality of slot format indicator indexes due to side-lobe or back-lobe leakage on one or more beams, while only one of them is the intended slot format indicator index for the UE. As a result, the UE may be unable to determine the actual slot format intended for the UE.

Some aspects described herein provide techniques and apparatuses for dynamic slot format indicator configuration. In some aspects, a BS may configure slot format indicator indexes to be transmitted with beam-specific parameters such that slot format indicator indexes transmitted on different beams (and thus, in different spatial directions) are transmitted in different resource configurations. In this case, the BS may transmit a plurality of sets of slot format indicator parameters, where each set is associated with a particular beam, and a PDCCH carrying a slot format indicator index that is to be transmitted on the beam. Each set of slot format indicator parameters may configure PDCCHs to be transmitted on different beams with different RNTIs (e.g., to be scrambled with different slot format indicator RNTIs (SFI-RNTIs)), to be transmitted in different time-domain resources and/or frequency domain resources, to be associated with different slot format configuration tables, to carry a slot format indicator index in different DCI locations, and/or the like. In this way, UEs communicating with the BS on different beams may be permitted to identify a slot format indicator index intended for the UE, may determine that a received slot format indicator index is not intended for the UE (and thus, the UE may disregard the slot format indicator index and remain in a power saving mode), and/or the like.

In some cases, the PDCCHs that carry indications of slot format indicator indexes may be configured in a semi-static manner (e.g., via a SlotFormatIndicator information element included in a radio resource control (RRC) signaling). In this case, dynamic adaptation of slot formats for the UE may be difficult, due to UE mobility. For example, the location of the UE may change over time, in which case the UE may switch serving beams with the BS, which may increase reconfiguration delay and overhead of switching the slot format for the UE. In some aspects described herein, the BS may dynamically select a set of slot format indicator parameters from the plurality of sets of slot format indicator parameters based at least in part on the mobility of the UE, and may transmit an indication of the set of slot format indicators in dynamic layer 1/layer 2 (L1/L2) signaling (e.g., DCI signaling, medium access control-control element (MAC-CE) signaling, and/or the like). In this way, the BS may use dynamic signaling to indicate a selected set of slot format indicators based at least in part on the mobility of the UE, as opposed to semi-statically reconfiguring a plurality of sets of slot format indicators, which decreases reconfiguration delay and signaling overhead.

Figure 5A:
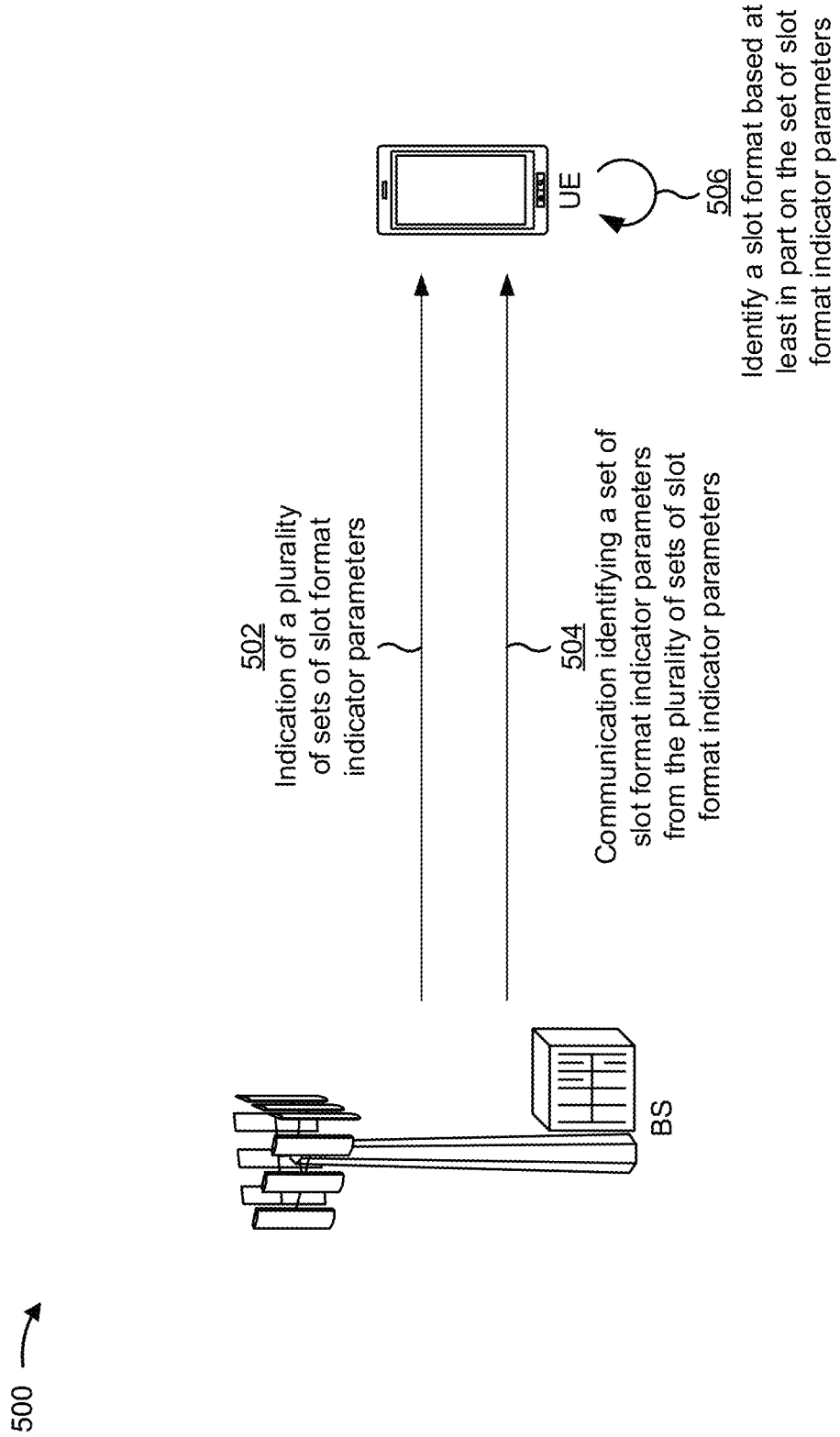
FIGS. 5A-5C are diagrams illustrating one or more examples of dynamic slot format indicator configuration, in accordance with various aspects of the present disclosure.
Figure 5B:
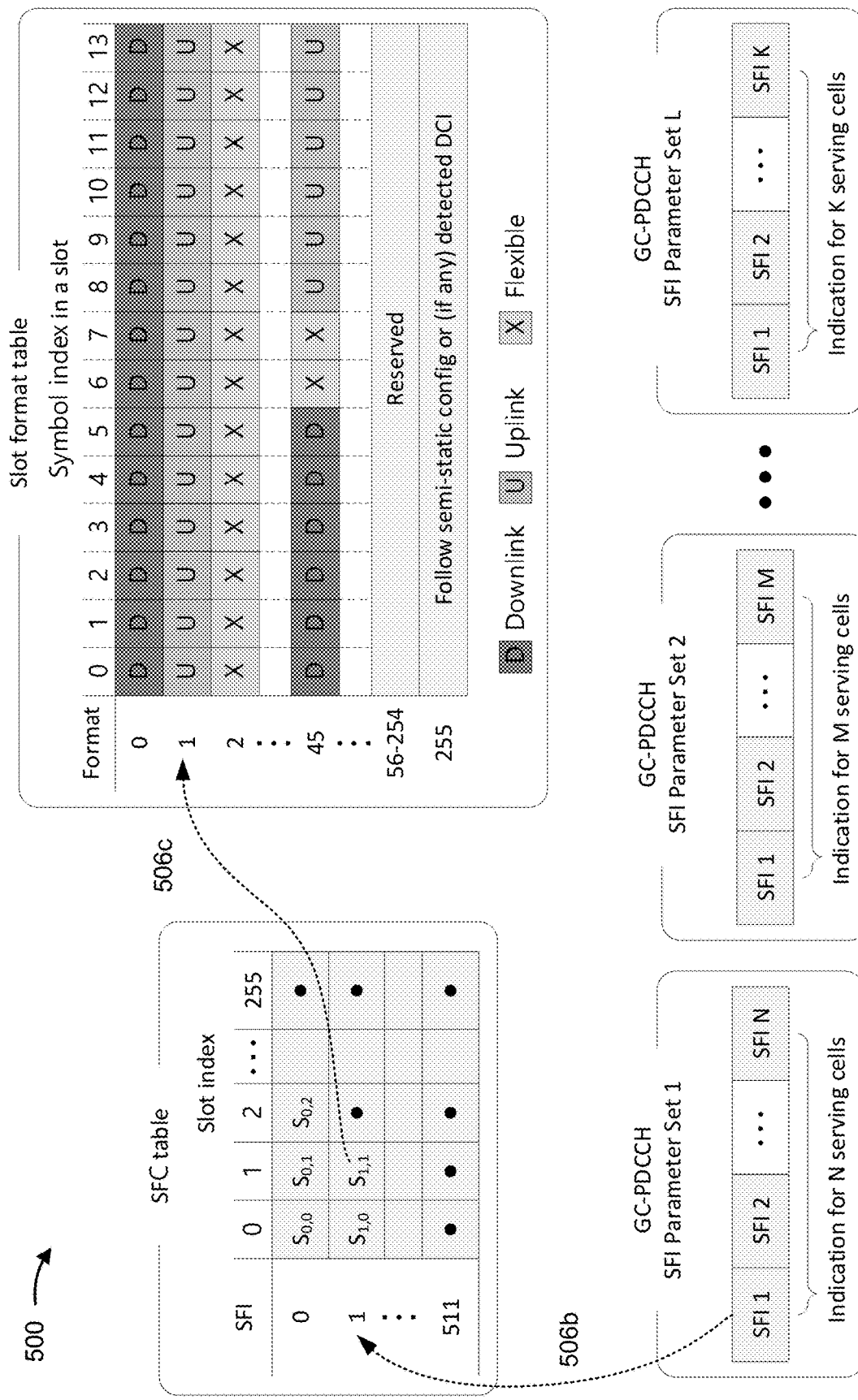
Figure 5C:
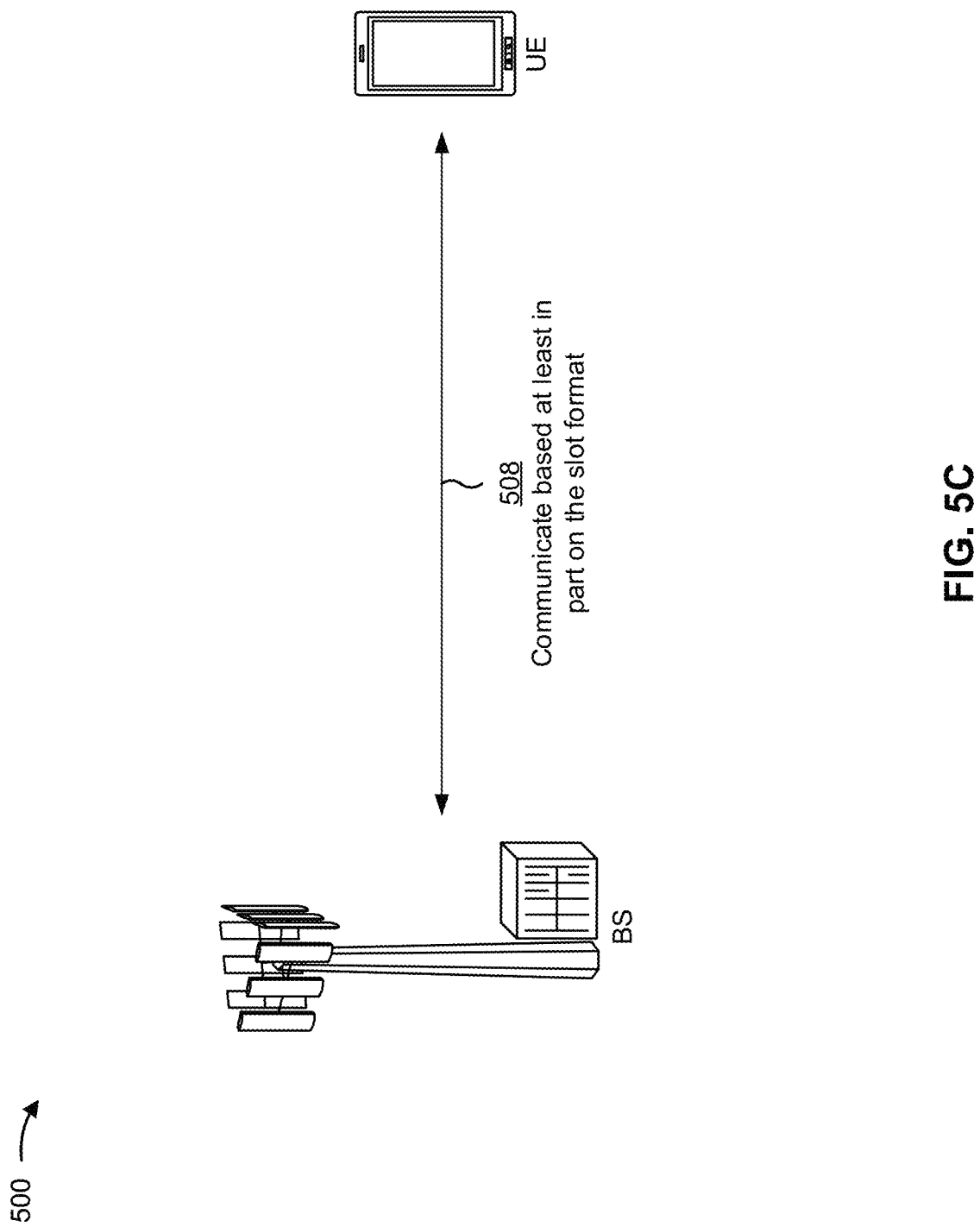

FIGS. 5A-5C are diagrams illustrating one or more examples 500 of dynamic slot format indicator configuration, in accordance with various aspects of the present disclosure. As shown in FIGS. 5A-5C, example(s) 500 may include communications between a BS (e.g., BS 110) and a UE (e.g., UE 120). In some aspects, the BS and the UE may be included in a wireless network (e.g., wireless network 100 and/or another wireless network). In some aspects, the BS and the UE may communicate on an access link, which may be configured with a frame structure (e.g., frame structure 300 and/or another frame structure) for a downlink and an uplink. Moreover, the BS and the UE may communicate on the access link using a slot format (e.g., slot format 410 and/or another slot format) in which each slot in a radio frame or subframe on the access link includes a plurality of symbols configured for downlink communication, uplink communication, and/or may be flexibly configured by the BS.

In some aspects, the access link may include one or more beam paired links of UE beams and BS beams. In some aspects, the UE may switch between different UE beams and/or BS beams, for example, based at least in part on mobility of the UE, based at least in part on beam measurements performed by the UE, and/or the like.

As shown in FIG. 5A, and by reference number 502, to reduce reconfiguration delay and signaling overhead of configuring the UE with slot formats on the one or more beam paired links, the BS may transmit, to the UE, an indication of a plurality of sets of slot format indicator parameters. In some aspects, each set of slot format indicator parameters may be associated with a respective beam of the BS and/or a respective beam paired link.

In some aspects, the BS may transmit the indication of the plurality of sets of slot format indicator parameters via semi-static signaling. For example, the BS may transmit the indication of the plurality of sets of slot format indicator parameters in one or more RRC communications (e.g., during connection establishment with the UE and/or after connection establishment), one or more system information communications (e.g., in one or more synchronization signal block (SSB) communications (e.g., which may be transmitted on a single beam of the BS, may be beam swept across a plurality of beams of the BS, and/or the like), one or more PBCH communications, and/or the like).

In some aspects, a set of slot format indicator parameters may include one or more parameters that may be used to identify a location of a PDCCH communication, associated with the beam that is associated with the set of slot format indicator parameters, that carries an indication of a slot format indicator index (or a plurality of slot format indicator indexes, each for a respective cell of the BS). For example, a set of slot format indicator parameters may identify the time-domain resources (e.g., one or more slots, one or more symbols, and/or the like) and/or the frequency-domain resources (e.g., one or more resource blocks, one or more resource elements, one or more subcarriers, and/or the like) in which the PDCCH communication is to be transmitted. The indication of the time-domain resources and/or the frequency-domain resources may include an indication of a search space set or associated search space set identifier (e.g., a common search space set, a Type3-PDCCH common search space set), may include an indication of a control resource set (CORESET) or associated CORESET identifier associated with the search space set, and/or the like.

As another example, a set of slot format indicator parameters may identify an SFI-RNTI with which the PDCCH communication associated with the set of slot format indicator parameters is to be scrambled. In this case, if the UE attempts to locate the PDCCH communication by using a blind decoding technique, the UE may identify the PDCCH communication based at least in part on determining that the UE successfully descrambled the PDCCH communication using the SFI-RNTI identified set of slot format indicator parameters.

In some aspects, a set of slot format indicator parameters may include one or more parameters that may be used to locate and/or identify a slot format indicator index included in an associated PDCCH communication. For example, a set of slot format indicator parameters may include a DCI format of DCI included in the PDCCH communication. The DCI format may identify a payload size of the DCI carrying the indication of the slot format indicator index, may identify a location of per-carrier information within the DCI payload, and/or the like.

In some aspects, a set of slot format indicator parameters may include one or more parameters that may be used to locate and/or identify a slot format. For example, a set of slot format indicator parameters may include an indication of a slot format configuration table into which a slot format indicator index, identified in a PDCCH communication associated with the set of slot format indicator parameters, indexes. In this case, the UE may identify the slot format indicator index in the PDCCH communication, may identify a slot format indicator in the slot format configuration table based at least in part on the slot format indicator index, and may identify a slot format in a slot format configuration table based at least in part on the slot format indicator.

In some aspects, the PDCCH communication associated with a set of slot format indicator parameters may include a GC-PDCCH communication that is directed to a group or plurality of UEs. In this case, each UE communicating with the BS on a particular beam may receive the GC-PDCCH communication and may identify a slot format for communication with the BS on the beam based at least in part on a slot format indicator index identified in the GC-PDCCH communication.

As further shown in FIG. 5A, and by reference number 504, the BS may transmit, to the UE, a communication that identifies a set of slot format indicator parameters from the plurality of slot format indicator parameters. In some aspects, the BS may select and dynamically indicate the set of slot format indicator parameters based at least in part on one or more events. For example, the BS may select a set of slot format indicator parameters based at least in part on mobility of the UE (e.g., based at least in part on relocation of the UE causing the UE to switch to a different serving beam or different beam of the BS). In this case, the UE may transmit an indication of the location of the UE to the BS, and the BS may select and transmit the indication of the slot format indicator parameters based at least in part on the indication of the UE location. The indication of the location of the UE may be an explicit indication of the location of the UE, may be an implicit indication of the location of the UE (e.g., a measurement report associated with a positioning reference signal transmitted from the BS), and/or the like. The UE may transmit the indication of the location of the UE in an uplink control information (UCI) communication, a MAC-CE communication, an RRC communication, and/or the like.

As another example, the BS may select a set of slot format indicator parameters based at least in part on receiving, from the UE, a channel quality measurement report associated with one or more beams of the BS. In this case, the BS may select a set of slot format indicator parameters associated with a beam having the highest or greatest reported measurement, may select a set of slot format indicator parameters associated with a beam having a measurement report that satisfies a threshold, and/or the like. The UE may transmit the indication of the measurement report in a UCI communication, a MAC-CE communication, an RRC communication, and/or the like.

As another example, the BS may select a set of slot format indicator parameters based at least in part on receiving, from the UE, a request for a particular slot format indicator index, a particular slot format indicator, and/or the like. In this case, the BS may select a set of slot format indicator parameters associated with the particular slot format indicator index, the particular slot format indicator, and/or the like. The UE may transmit the indication of the particular slot format indicator index, the particular slot format indicator, and/or the like in a UCI communication, a MAC-CE communication, an RRC communication, and/or the like.

In some aspects, the BS may explicitly indicate the set of slot format indicator parameters in a DCI communication, in a MAC-CE communication, and/or the like. In some aspects, the DCI format of the DCI communication may be a slot format indicator DCI format that is defined to identify a set of slot format indicator parameters. In some aspects, the DCI format of the DCI communication may be another DCI format, such as a scheduling DCI, in which one or more fields may be repurposed for indicating sets of slot format indicator parameters.

In some aspects, the BS may implicitly indicate a set of slot format indicator parameters. For example, each of the plurality of sets of slot format indicator parameters may be associated with a bandwidth part (BWP) or BWP identifier. In this case, the BS may implicitly indicate a set of slot format indicator parameters by transmitting, to the UE, a BWP switching communication that identifies a BWP identifier. In this case, the UE may determine that the set of slot format indicator parameters, selected by the BS, is the set of slot format indicator parameters associated with the BWP identifier.

As another example, each of the plurality of sets of slot format indicator parameters may be associated with a transmission configuration indicator (TCI) state, an SSB identifier, and/or a PBCH identifier. In this case, the BS may implicitly indicate a set of slot format indicator parameters by transmitting, to the UE, a TCI state update communication that identifies a TCI state, an SSB identifier, and/or a PBCH identifier. In this case, the UE may determine that the set of slot format indicator parameters, selected by the BS, is the set of slot format indicator parameters associated with the TCI state, the SSB identifier, and/or the PBCH identifier.

As further shown in FIG. 5A, and by reference number 506, the UE may receive the communication identifying the set of slot format indication parameters and may identify a slot format, for communication with the BS, based at least in part on the set of slot format indicator parameters identified in the communication.

As shown in FIG. 5B, and by reference number 506a, the UE may identify the slot format by locating and/or identifying the PDCCH communication (e.g., the GC-PDCCH communication) associated with the set of slot format indicator parameters. In some aspects, each GC-PDCCH communication may configure one or more slot format indicator indexes for one or more cells associated with the BS. For example, the UE may receive an indication of slot format indicator (SFI) parameter set 1, and may locate the GC-PDCCH communication transmitted in the time-domain resources and/or frequency-domain resources identified in SFI parameter set 1, may identify the GC-PDCCH communication scrambled with the SFI-RNTI identified in SFI parameter set 1, and/or the like. The UE may identify the slot format indicator index (e.g., SFI 1) included in the GC-PDCCH communication based at least in part on a DCI format identified in SFI parameter set 1 (e.g., the DCI payload size, the location of per-carrier information within the DCI payload, and/or the like), based at least in part on a serving cell of the BS in which the UE is located, and/or the like.

As further shown in FIG. 5B, and by reference number 506b, the UE may identify a slot format indicator based at least in part on the slot format indicator index. For example, the UE may perform a look-up of the slot format indicator index in a slot configuration table identified in the set of slot format indicator parameters. The UE may identify a slot format indicator (e.g., $S_{1,1}$) associated with a combination of the slot format indicator index (e.g., SFI 1) and a slot index of a slot in which the UE is to communicate with the BS (e.g., slot index 1).

As further shown in FIG. 5B, and by reference number 506c, the UE may identify a slot format based at least in part on the slot format indicator. For example, the UE may perform a look-up in a slot format table to identify a slot format associated with the slot format indicator. The slot format may include a particular combination of downlink symbols, uplink symbols, flexible symbols, and/or other types of symbols.

As shown in FIG. 5C, and by reference number 508, the UE and the BS may communicate in the slot based at least in part on the slot format. For example, the BS may transmit downlink communications to the UE in the downlink symbols, the UE may transmit uplink communications to the BS in the uplink symbols, and/or the like. As another example, the BS may dynamically configure one or more flexible symbols for downlink communication, uplink communication, and/or the like. If a flexible symbol is not dynamically configured by the BS, the UE may refrain from monitoring for downlink communications from the BS, which permits the UE to save power in the flexible symbols.

In this way, the BS may use dynamic signaling to indicate a selected set of slot format indicators based at least in part on the mobility of the UE, as opposed to semi-statically reconfiguring a plurality of sets of slot format indicators, which decreases reconfiguration delay and signaling overhead.

As indicated above, FIGS. 5A-5C are provided as one or more examples. Other examples may differ from what is described with respect to FIGS. 5A-5C.

Figure 6:
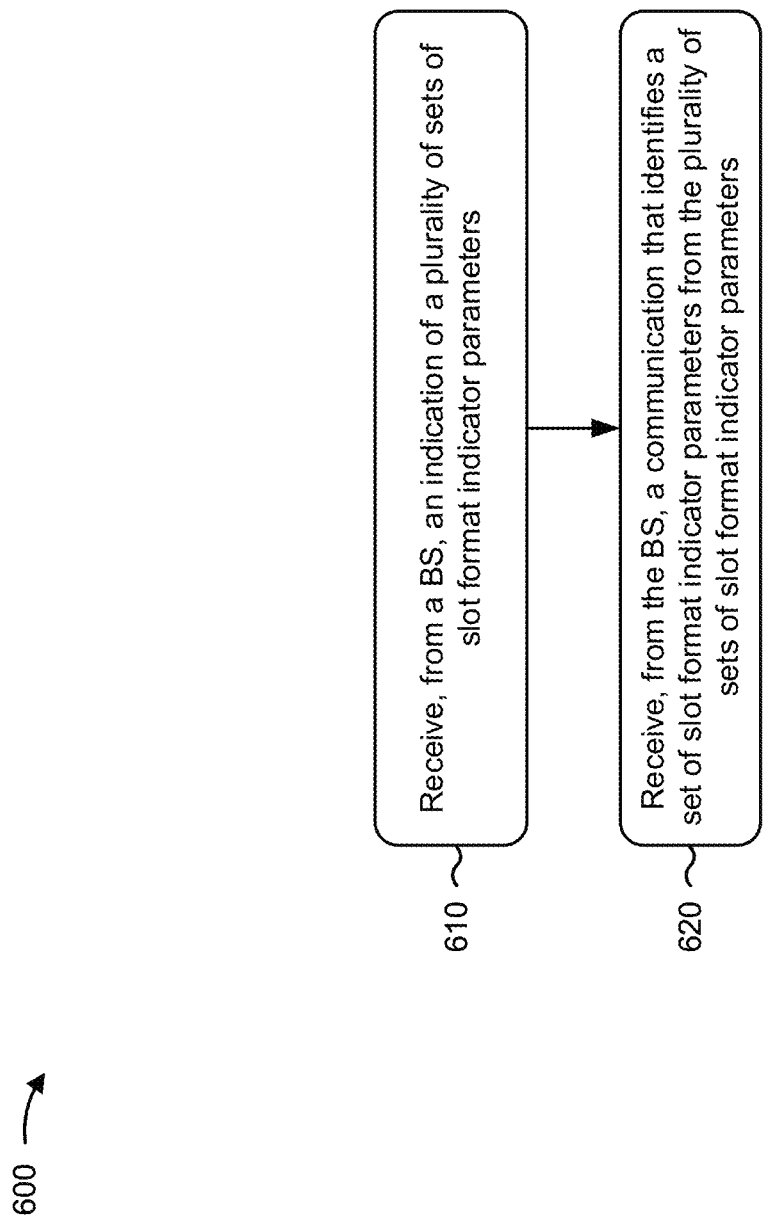
FIG. 6 is a diagram illustrating an example process performed, for example, by a UE, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120 and/or the like) performs operations associated with dynamic slot format indicator configuration.

As shown in FIG. 6, in some aspects, process 600 may include receiving, from a BS, an indication of a plurality of sets of slot format indicator parameters (block 610). For example, the UE (e.g., using receive processor 258, transmit processor 264, controller/processor 280, memory 282, and/or the like) may receive, from a BS, an indication of a plurality of sets of slot format indicator parameters, as described above in connection with FIGS. 5A and 5B.

In some aspects, the plurality of sets of slot format indicator parameters identify at least one of a slot format indicator radio network temporary identifier, a DCI payload size, a location of per-carrier information within a DCI payload, a physical downlink control channel common search space, a slot format combination table, or a control resource set associated with the common search space. In some aspects, the indication of the plurality of sets of slot format indicator parameters is included in at least one of a radio resource control communication, a medium access control control element communication, or a downlink control information communication.

As further shown in FIG. 6, in some aspects, process 600 may include receiving, from the BS, a communication that identifies a set of slot format indicator parameters from the plurality of sets of slot format indicator parameters (block 620). For example, the UE (e.g., using receive processor 258, transmit processor 264, controller/processor 280, memory 282, and/or the like) may receive, from the BS, a communication that identifies a set of slot format indicator parameters from the plurality of sets of slot format indicator parameters, as described above, as described above in connection with FIGS. 5A and 5B.

In some aspects, the communication comprises at least one of a radio resource control communication, a medium access control control element communication, or a downlink control information communication. In some aspects, the communication comprises a DCI communication having a slot format indication DCI format or a DCI communication having a scheduling DCI format and including a field indicating the set of slot format indicator parameters.

In some aspects, the set of slot format indicator parameters is associated with a BWP identifier, and the communication comprises a BWP switching communication that identifies the set of slot format indicator parameters based at least in part on the BWP identifier. In some aspects, the set of slot format indicator parameters is associated with a set of TCI states, and the communication comprises a TCI state update communication that identifies the set of slot format indicator parameters based at least in part on the set of TCI states. In some aspects, the set of slot format indicator parameters is associated with an SSB identifier, and the communication comprises a TCI state update communication that identifies the set of slot format indicator parameters based at least in part on the SSB identifier.

In some aspects, receiving the communication that identifies the set of slot format indicator parameters comprises receiving the communication that identifies the set of slot format indicator parameters based at least in part on transmitting, to the BS, a channel quality measurement report associated with one or more beams of the BS.

In some aspects, receiving the communication that identifies the set of slot format indicator parameters comprises receiving the communication that identifies the set of slot format indicator parameters based at least in part on transmitting, to the BS, a request for a slot format indicator index associated with the set of slot format indicator parameters. In some aspects, the request for the slot format indicator index associated with the set of slot format indicator parameters is included in at least one of an uplink control information communication, a medium access control control element communication, or a radio resource control communication.

In some aspects, receiving the communication that identifies the set of slot format indicator parameters comprises receiving the communication that identifies the set of slot format indicator parameters based at least in part on transmitting, to the BS, an indication of a location of the UE. In some aspects, the indication of the location of the UE comprises an explicit indication of the location of the UE or a measurement report associated with a positioning reference signal.

Process 600 may include additional aspects, such as any single aspect or any combination of aspects described below, above, and/or in connection with one or more other processes described elsewhere herein.

In some aspects, process 600 further comprises identifying, based at least in part on the set of slot format indicator parameters, a physical downlink control channel communication that identifies a slot format indicator index for communication with the BS.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
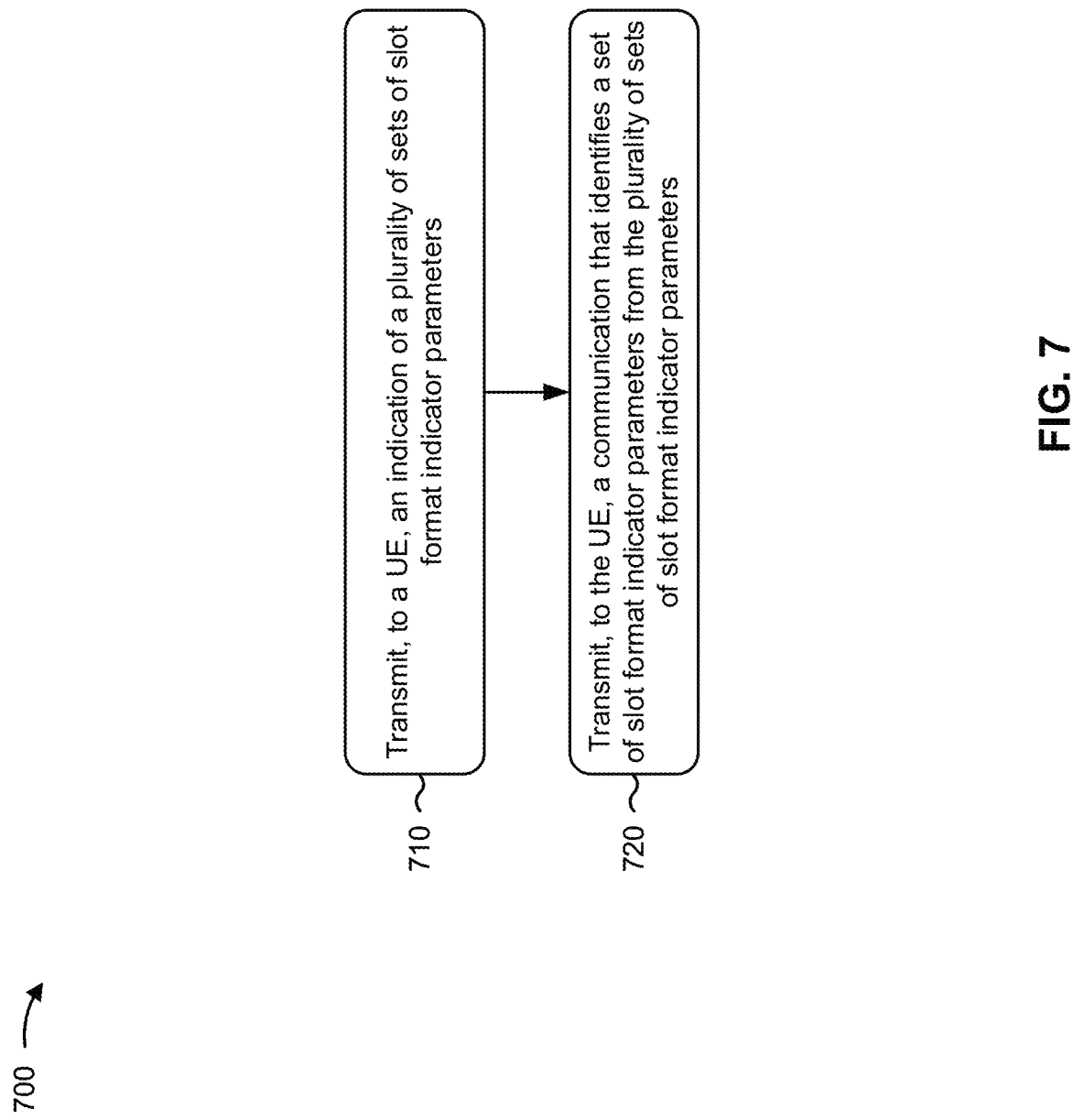
FIG. 7 is a diagram illustrating an example process performed, for example, by a BS, in accordance with various aspects of the present disclosure.

FIG. 7 is a diagram illustrating an example process 700 performed, for example, by a BS, in accordance with various aspects of the present disclosure. Example process 700 is an example where the BS (e.g., BS 110 and/or the like) performs operations associated with dynamic slot format indicator configuration.

As shown in FIG. 7, in some aspects, process 700 may include transmitting, to a UE, an indication of a plurality of sets of slot format indicator parameters (block 710). For example, the BS (e.g., using transmit processor 220, receive processor 238, controller/processor 240, memory 242, and/or the like) may transmit, to a UE, an indication of a plurality of sets of slot format indicator parameters, as described above, as described above in connection with FIGS. 5A and 5B.

In some aspects, the plurality of sets of slot format indicator parameters identify at least one of a slot format indicator radio network temporary identifier, a DCI payload size, a location of per-carrier information within a DCI payload, a slot format combination table, a physical downlink control channel common search space, or a control resource set associated with the common search space. In some aspects, the indication of the plurality of sets of slot format indicator parameters is included in at least one of a radio resource control communication, a medium access control control element communication, or a downlink control information communication.

As further shown in FIG. 7, in some aspects, process 700 may include transmitting, to the UE, a communication that identifies a set of slot format indicator parameters from the plurality of sets of slot format indicator parameters (block 720). For example, the BS (e.g., using transmit processor 220, receive processor 238, controller/processor 240, memory 242, and/or the like) may transmit, to the UE, a communication that identifies a set of slot format indicator parameters from the plurality of sets of slot format indicator parameters, as described above, as described above in connection with FIGS. 5A and 5B. In some aspects, the communication comprises at least one of a radio resource control communication, a medium access control control element communication, or a downlink control information communication.

In some aspects, the communication comprises a DCI communication having a slot format indication DCI format or a DCI communication having a scheduling DCI format and including a field indicating the set of slot format indicator parameters. In some aspects, the set of slot format indicator parameters is associated with a BWP identifier, and the communication comprises a BWP switching communication that identifies the set of slot format indicator parameters based at least in part on the BWP identifier. In some aspects, the set of slot format indicator parameters is associated with a set of TCI states, and the communication comprises a TCI state update communication that identifies the set of slot format indicator parameters based at least in part on the set of TCI states.

In some aspects, the set of slot format indicator parameters is associated with an SSB identifier, and the communication comprises a TCI state update communication that identifies the set of slot format indicator parameters based at least in part on the SSB identifier. In some aspects, transmitting the communication that identifies the set of slot format indicator parameters comprises transmitting the communication that identifies the set of slot format indicator parameters based at least in part on receiving, from the UE, a channel quality measurement report associated with one or more beams of the BS.

In some aspects, transmitting the communication that identifies the set of slot format indicator parameters comprises transmitting the communication that identifies the set of slot format indicator parameters based at least in part on receiving, from the UE, a request for a slot format indicator index associated with the set of slot format indicator parameters. In some aspects, the request for the slot format indicator index associated with the set of slot format indicator parameters is included in at least one of an uplink control information communication, a medium access control control element communication, or a radio resource control communication.

In some aspects, transmitting the communication that identifies the set of slot format indicator parameters comprises transmitting the communication that identifies the set of slot format indicator parameters based at least in part on receiving, from the UE, an indication of a location of the UE. In some aspects, the indication of the location of the UE comprises an explicit indication of the location of the UE or a measurement report associated with a positioning reference signal.

Process 700 may include additional aspects, such as any single aspect or any combination of aspects described above and/or in connection with one or more other processes described elsewhere herein.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
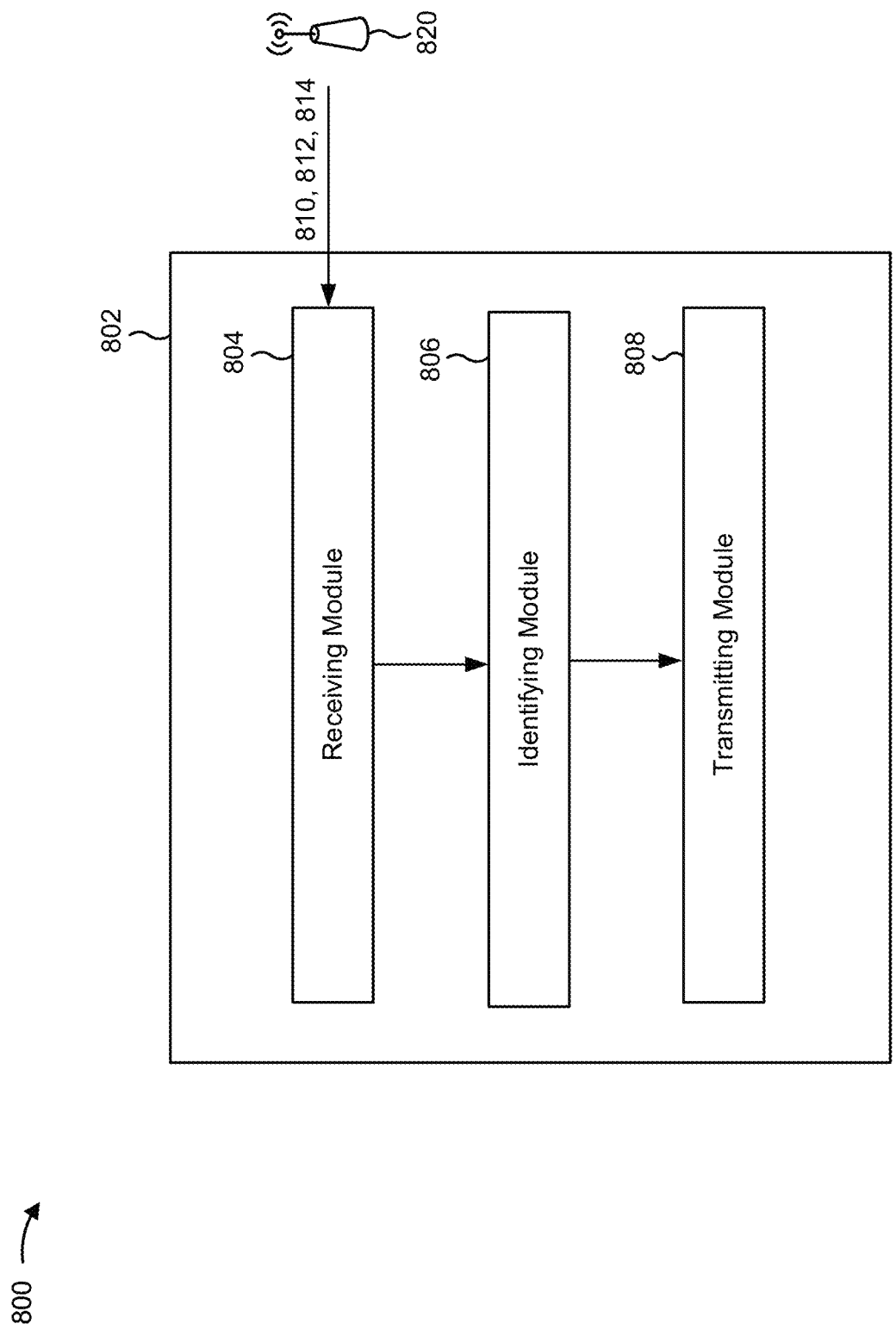
FIG. 8 is a conceptual data flow diagram illustrating the data flow between different modules/means/components in an example apparatus, in accordance with various aspects of the present disclosure.

FIG. 8 is a conceptual data flow diagram 800 illustrating data flow between different modules/means/components in an example apparatus 802. The apparatus 802 may be a UE (e.g., UE 120). In some aspects, the apparatus 802 includes a receiving module 804, an identifying module 806, and a transmitting module 808.

In some aspects, receiving module 804 may receive an indication 810 of a plurality of sets of slot format indicator parameters from a BS 820 (e.g., BS 110). Each set of slot format indicator parameters may be used to identify a location of an associated PDCCH communication (e.g., a GC-PDCCH or another type of PDCCH carrying a slot format indicator index) transmitted from BS 820. In some aspects, receiving module 804 may receive a communication 812 that identifies a set of slot format indicator parameters from the plurality of sets of slot format indicator parameters. In some aspects, receiving module 804 may include an antenna (e.g., antenna 252), a DEMOD (e.g., DEMOD 254), a MIMO detector (e.g., MIMO detector 256), a receive processor (e.g., receive processor 258), a controller/processor (e.g., controller/processor 280), a memory (e.g., a memory 282), and/or the like.

In some aspects, identifying module 806 may identify a PDCCH communication 814, transmitted from BS 820, that identifies a slot format indicator index for communication with BS 820. In some aspects, identifying module 806 may identify the PDCCH communication 814 based at least in part on the set of slot format indicator parameters identified in the communication 812. For example, identifying module 806 may descramble the PDCCH communication 814 based at least in part on an RNTI (e.g., an SFI-RNTI and/or another type of RNTI) identified in the communication 812. As another example, identifying module 806 may identify a set of time-domain resources and/or frequency-domain resources in which PDCCH communication 814 is transmitted based at least in part on a CORESET and/or search space set (e.g., a common search space set, a Type3-PDCCH common search space set, and/or the like). In some aspects, identifying module 806 may identify the slot format indicator index in the PDCCH communication 814 based at least in part on a DCI format of the PDCCH communication 814 (e.g., a DCI payload size of the PDCCH communication 814, a location of per-carrier information within the DCI payload of the PDCCH communication 814, and/or the like). In some aspects, identifying module 806 may include a receive processor (e.g., receive processor 258), a transmit processor (e.g., transmit processor 264), a controller/processor (e.g., controller/processor 280), a memory (e.g., a memory 282), and/or the like.

In some aspects, receiving module 804 and/or transmitting module 808 may communicate with the BS 820 based at least in part on the slot format indicator index identified in the PDCCH communication 814. For example, receiving module 804 may receive downlink communications in symbols identified as downlink symbols in a slot format associated with the slot format indicator index. As another example, transmitting module 808 may transmit uplink communications in symbols identified as uplink symbols in a slot format associated with the slot format indicator index. In some aspects, identifying module 806 may identify the slot format based at least in part on identifying a slot format indicator, associated with the slot format indicator index, in the slot format configuration table. In some aspects, transmitting module 808 may include an antenna (e.g., antenna 252), a MOD (e.g., MOD 254), a transmit processor (e.g., transmit processor 264), a Tx MIMO processor (e.g., Tx MIMO processor 266), a controller/processor (e.g., controller/processor 280), a memory (e.g., a memory 282), and/or the like.

The apparatus may include additional modules that perform each of the blocks of the algorithm in the aforementioned process 600 of FIG. 6 and/or the like. Each block in the aforementioned process 600 of FIG. 6 and/or the like may be performed by a module, and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 8 are provided as an example. In practice, there may be additional modules, fewer modules, different modules, or differently arranged modules than those shown in FIG. 8. Furthermore, two or more modules shown in FIG. 8 may be implemented within a single module, or a single module shown in FIG. 8 may be implemented as multiple, distributed modules. Additionally, or alternatively, a set of modules (e.g., one or more modules) shown in FIG. 8 may perform one or more functions described as being performed by another set of modules shown in FIG. 8.

Figure 9:
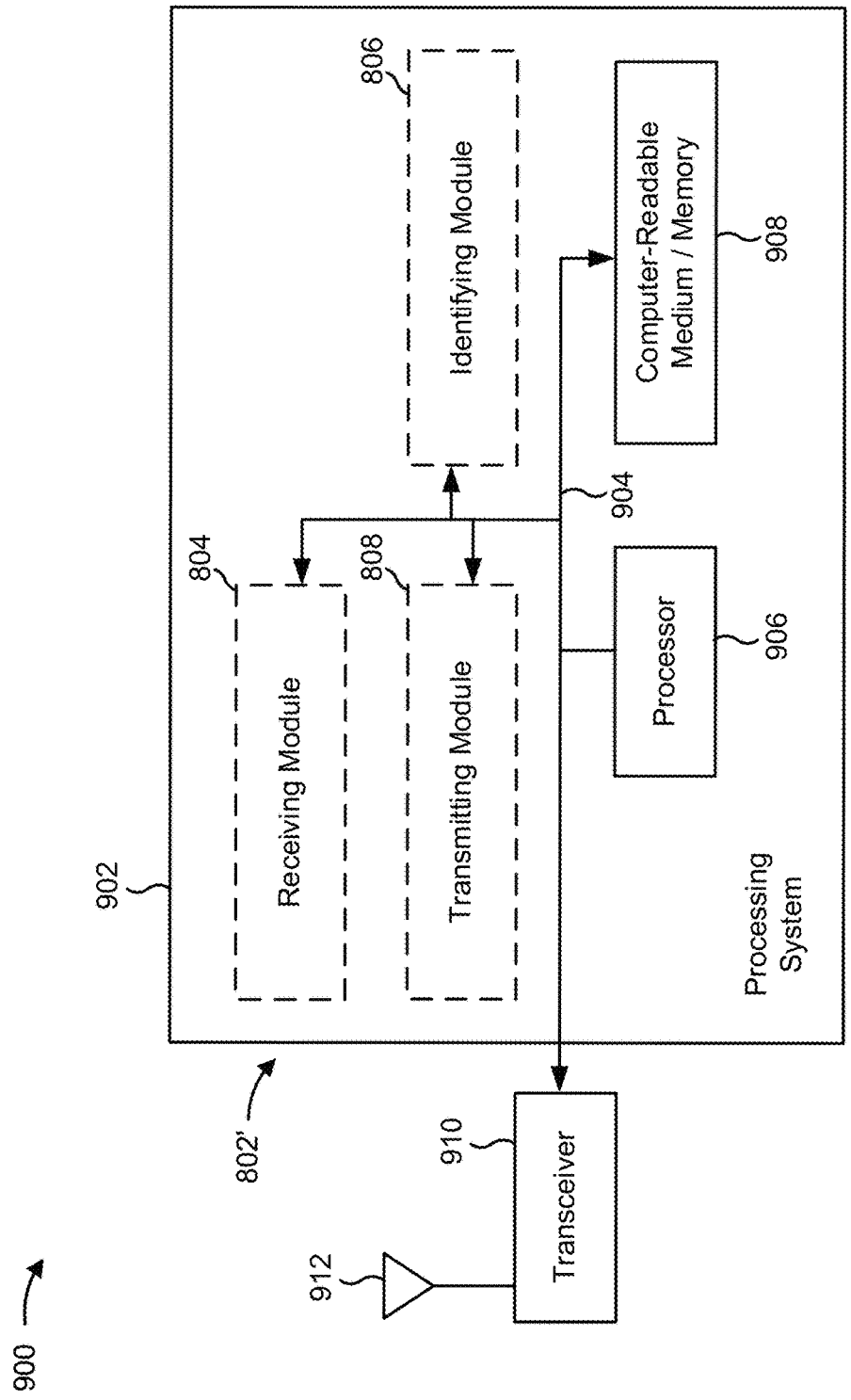
FIG. 9 is a diagram illustrating an example of a hardware implementation for an apparatus employing a processing system, in accordance with various aspects of the present disclosure.

FIG. 9 is a diagram 900 illustrating an example of a hardware implementation for an apparatus 802' employing a processing system 902. The apparatus 802' may be a UE (e.g., UE 120).

The processing system 902 may be implemented with a bus architecture, represented generally by the bus 904. The bus 904 may include any number of interconnecting buses and bridges depending on the specific application of the processing system 902 and the overall design constraints. The bus 904 links together various circuits including one or more processors and/or hardware modules, represented by the processor 906, the modules 804, 806, and 808, and the computer-readable medium/memory 908. The bus 904 may also link various other circuits such as timing sources, peripherals, voltage regulators, and power management circuits, which are well known in the art, and therefore will not be described any further.

The processing system 902 may be coupled to a transceiver 910. The transceiver 910 is coupled to one or more antennas 912. The transceiver 910 provides a means for communicating with various other apparatuses over a transmission medium. The transceiver 910 receives a signal from the one or more antennas 912, extracts information from the received signal, and provides the extracted information to the processing system 902. In addition, the transceiver 910 receives information from the processing system 902, specifically the transmitting module 808, and based at least in part on the received information, generates a signal to be applied to the one or more antennas 912. The processing system 902 includes a processor 906 coupled to a computer-readable medium/memory 908. The processor 906 is responsible for general processing, including the execution of software stored on the computer-readable medium/memory 908. The software, when executed by the processor 906, causes the processing system 902 to perform the various functions described herein for any particular apparatus. The computer-readable medium/memory 908 may also be used for storing data that is manipulated by the processor 906 when executing software. The processing system further includes at least one of the modules 804, 806, and 808. The modules may be software modules running in the processor 906, resident/stored in the computer readable medium/memory 908, one or more hardware modules coupled to the processor 906, or some combination thereof. The processing system 902 may be a component of the UE 120 and may include the memory 282 and/or at least one of the transmit processor 264, the receive processor 258, and/or the controller/processor 280.

In some aspects, the apparatus 802/802' for wireless communication includes means for receiving, from a BS, an indication of a plurality of sets of slot format indicator parameters, means for receiving, from the BS, a communication that identifies a set of slot format indicator parameters from the plurality of sets of slot format indicator parameters, means for identifying, based at least in part on the set of slot format indicator parameters, a physical downlink control channel communication that identifies a slot format indicator index for communication with the BS, means for communicating with the BS based at least in part on a slot format associated with a slot format indicator corresponding to the slot format indicator index and a slot index, and/or the like. The aforementioned means may be one or more of the aforementioned modules of the apparatus 802 and/or the processing system 902 of the apparatus 802' configured to perform the functions recited by the aforementioned means. As described elsewhere herein, the processing system 902 may include the transmit processor 264, the receive processor 258, and/or the controller/processor 280. In one configuration, the aforementioned means may be the transmit processor 264, the receive processor 258, and/or the controller/processor 280 configured to perform the functions and/or operations recited herein.

FIG. 9 is provided as an example. Other examples may differ from what is described in connection with FIG. 9.

Figure 10:
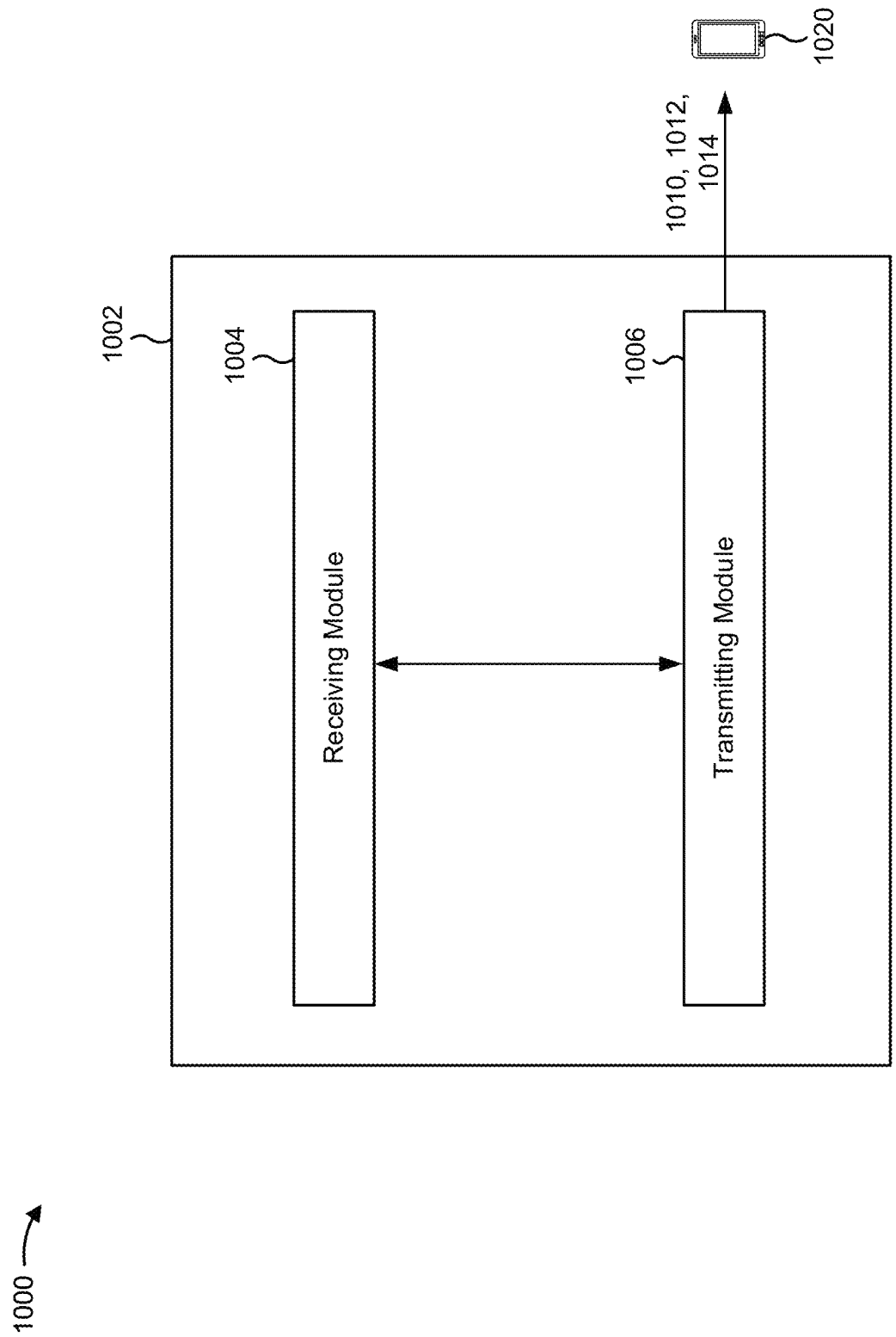
FIG. 10 is a conceptual data flow diagram illustrating the data flow between different modules/means/components in an example apparatus, in accordance with various aspects of the present disclosure.

FIG. 10 is a conceptual data flow diagram 1000 illustrating data flow between different modules/means/components in an example apparatus 1002. The apparatus 1002 may be a BS (e.g., BS 110). In some aspects, the apparatus 1002 includes a receiving module 1004 and a transmitting module 1006.

In some aspects, transmitting module 1006 may transmit an indication 1010 of a plurality of sets of slot format indicator parameters to a UE 1020 (e.g., UE 120). Each set of slot format indicator parameters may be used to identify a location of an associated PDCCH communication (e.g., a GC-PDCCH or another type of PDCCH carrying a slot format indicator index) transmitted by transmitting module 1006. In some aspects, transmitting module 1006 may transmit a communication 1012 that identifies a set of slot format indicator parameters from the plurality of sets of slot format indicator parameters. In some aspects, transmitting module 1006 may transmit a PDCCH communication 1014, associated with the set of slot format indicator parameters identified in the communication 1012, that identifies a slot format indicator index. In some aspects, transmitting module 1006 may include an antenna (e.g., antenna 234), a MOD (e.g., MOD 232), a transmit processor (e.g., transmit processor 220), a Tx MIMO processor (e.g., Tx MIMO processor 230), a controller/processor (e.g., controller/processor 240), a memory (e.g., a memory 242), and/or the like.

In some aspects, receiving module 1004 and/or transmitting module 1006 may communicate with the UE 1020 based at least in part on a slot format indicator index identified in the PDCCH communication 1014. For example, transmitting module 1006 may transmit downlink communications in symbols identified as downlink symbols in a slot format associated with the slot format indicator index. As another example, receiving module 1004 may receive uplink communications in symbols identified as uplink symbols in a slot format associated with the slot format indicator index. In some aspects, receiving module 804 may include an antenna (e.g., antenna 234), a DEMOD (e.g., DEMOD 232), a MIMO detector (e.g., MIMO detector 236), a receive processor (e.g., receive processor 238), a controller/processor (e.g., controller/processor 240), a memory (e.g., a memory 242), and/or the like.

The apparatus may include additional modules that perform each of the blocks of the algorithm in the aforementioned process 700 of FIG. 7 and/or the like. Each block in the aforementioned process 700 of FIG. 7 and/or the like may be performed by a module, and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 10 are provided as an example. In practice, there may be additional modules, fewer modules, different modules, or differently arranged modules than those shown in FIG. 10. Furthermore, two or more modules shown in FIG. 10 may be implemented within a single module, or a single module shown in FIG. 10 may be implemented as multiple, distributed modules. Additionally, or alternatively, a set of modules (e.g., one or more modules) shown in FIG. 10 may perform one or more functions described as being performed by another set of modules shown in FIG. 10.

Figure 11:
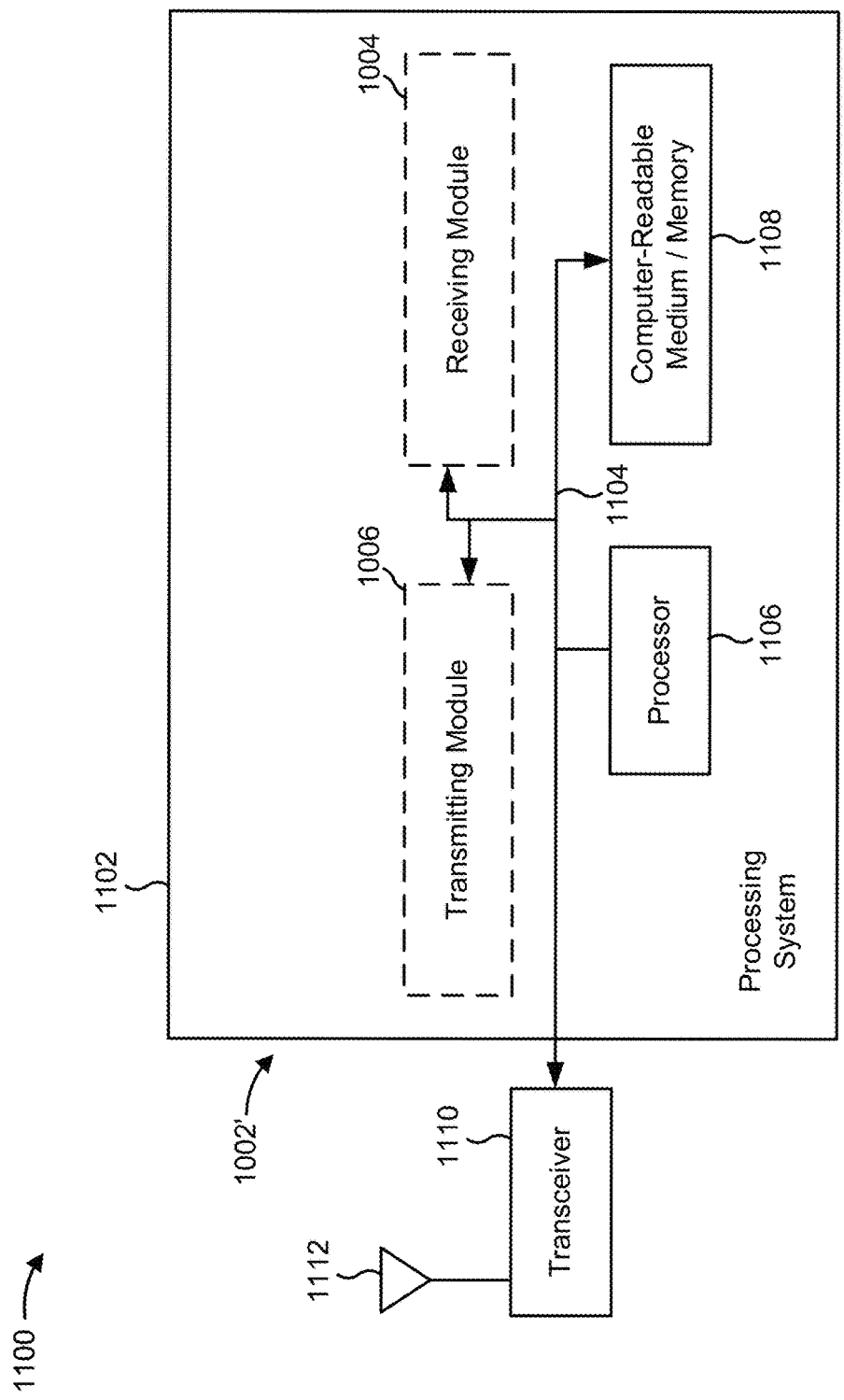
FIG. 11 is a diagram illustrating an example of a hardware implementation for an apparatus employing a processing system, in accordance with various aspects of the present disclosure.

FIG. 11 is a diagram 1100 illustrating an example of a hardware implementation for an apparatus 1002' employing a processing system 1102. The apparatus 1002' may be a BS (e.g., BS 110).

The processing system 1102 may be implemented with a bus architecture, represented generally by the bus 1104. The bus 1104 may include any number of interconnecting buses and bridges depending on the specific application of the processing system 1102 and the overall design constraints. The bus 1104 links together various circuits including one or more processors and/or hardware modules, represented by the processor 1106, the modules 1004 and 1006, and the computer-readable medium/memory 1108. The bus 1104 may also link various other circuits such as timing sources, peripherals, voltage regulators, and power management circuits, which are well known in the art, and therefore will not be described any further.

The processing system 1102 may be coupled to a transceiver 1110. The transceiver 1110 is coupled to one or more antennas 1112. The transceiver 1110 provides a means for communicating with various other apparatuses over a transmission medium. The transceiver 1110 receives a signal from the one or more antennas 1112, extracts information from the received signal, and provides the extracted information to the processing system 1102. In addition, the transceiver 910 receives information from the processing system 1102, specifically the transmitting module 1006, and based at least in part on the received information, generates a signal to be applied to the one or more antennas 1112. The processing system 1102 includes a processor 1106 coupled to a computer-readable medium/memory 1108. The processor 1106 is responsible for general processing, including the execution of software stored on the computer-readable medium/memory 1108. The software, when executed by the processor 1106, causes the processing system 1102 to perform the various functions described herein for any particular apparatus. The computer-readable medium/memory 1108 may also be used for storing data that is manipulated by the processor 1106 when executing software. The processing system further includes at least one of the modules 1004 and 1006. The modules may be software modules running in the processor 1106, resident/stored in the computer readable medium/memory 1108, one or more hardware modules coupled to the processor 1106, or some combination thereof. The processing system 1102 may be a component of the BS 110 and may include the memory 242 and/or at least one of the transmit processor 220, the receive processor 238, and/or the controller/processor 240.

In some aspects, the apparatus 1002/1002' for wireless communication includes means for transmitting, to a UE, an indication of a plurality of sets of slot format indicator parameters, means for transmitting, to the UE, a communication that identifies a set of slot format indicator parameters from the plurality of sets of slot format indicator parameters, means for communicating with the UE based at least in part on a slot format associated with a slot format indicator corresponding to a slot format indicator index identified in a PDCCH communication associated with the set of slot format indicator parameters, and/or the like. The aforementioned means may be one or more of the aforementioned modules of the apparatus 1002 and/or the processing system 1102 of the apparatus 1002' configured to perform the functions recited by the aforementioned means. As described elsewhere herein, the processing system 1102 may include the transmit processor 220, the receive processor 238, and/or the controller/processor 240. In one configuration, the aforementioned means may be the transmit processor 220, the receive processor 238, and/or the controller/processor 240 configured to perform the functions and/or operations recited herein.

FIG. 11 is provided as an example. Other examples may differ from what is described in connection with FIG. 11.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, from a network node, a first communication that identifies a plurality of sets of slot format indicator parameters;
   receiving, from the network node and based at least in part on receiving the first communication, a second communication that identifies a set of slot format indicator parameters from the plurality of sets of slot format indicator parameters;
   identifying, based at least in part on the set of slot format indicator parameters, a physical downlink control channel communication, transmitted by the network node, identifying a slot format indicator index for communicating with the network node; and
   communicating with the network node based at least in part on the slot format indicator index.

2. The method of claim 1, wherein the plurality of sets of slot format indicator parameters identifies at least one of:
   a slot format indicator radio network temporary identifier,
   a downlink control information (DCI) payload size,
   a location of per-carrier information within a DCI payload,
   a slot format combination table,
   a physical downlink control channel common search space, or
   a control resource set associated with the common search space.

3. The method of claim 1, wherein the first communication comprises at least one of:
   a radio resource control communication,
   a medium access control control element communication, or
   a downlink control information communication.

4. The method of claim 1, wherein the second communication comprises at least one of:
   a radio resource control communication,
   a medium access control control element communication, or
   a downlink control information communication.

5. The method of claim 1, wherein the second communication comprises:
   a downlink control information (DCI) communication having a slot format indication DCI format, or
   a DCI communication having a scheduling DCI format and including a field indicating the set of slot format indicator parameters.

6. The method of claim 1, wherein the set of slot format indicator parameters is associated with a bandwidth part (BWP) identifier; and
   wherein the second communication comprises:
      a BWP switching communication that identifies the set of slot format indicator parameters based at least in part on the BWP identifier.

7. The method of claim 1, wherein the set of slot format indicator parameters is associated with a set of transmission configuration indicator (TCI) states; and
   wherein the second communication comprises:
      a TCI state update communication that identifies the set of slot format indicator parameters based at least in part on the set of TCI states.

8. The method of claim 1, wherein the set of slot format indicator parameters is associated with a synchronization signal block (SSB) identifier; and
   wherein the second communication comprises:
      a transmission configuration indicator (TCI) state update communication that identifies the set of slot format indicator parameters based at least in part on the SSB identifier.

9. The method of claim 1, wherein receiving the second communication that identifies the set of slot format indicator parameters comprises:
   receiving the second communication that identifies the set of slot format indicator parameters based at least in part on transmitting, to the network node, a channel quality measurement report associated with one or more beams of the network node.

10. The method of claim 1, wherein receiving the second communication that identifies the set of slot format indicator parameters comprises:
    receiving the second communication that identifies the set of slot format indicator parameters based at least in part on transmitting, to the network node, a request for a slot format indicator index associated with the set of slot format indicator parameters.

11. The method of claim 10, wherein the request for the slot format indicator index associated with the set of slot format indicator parameters is included in at least one of:
    an uplink control information communication,
    a medium access control control element communication, or
    a radio resource control communication.

12. The method of claim 1, wherein receiving the second communication that identifies the set of slot format indicator parameters comprises:
    receiving the second communication that identifies the set of slot format indicator parameters based at least in part on transmitting, to the network node, an indication of a location of the UE.

13. The method of claim 12, wherein the first communication comprises:
    an explicit indication of the location of the UE, or
    a measurement report associated with a positioning reference signal.

14. A method of wireless communication performed by a network node, comprising:
- transmitting, to a user equipment (UE), a first communication that identifies a plurality of sets of slot format indicator parameters;
- transmitting, to the UE and based at least in part on transmitting the first communication, a second communication that identifies a set of slot format indicator parameters from the plurality of sets of slot format indicator parameters;
- transmitting, to the UE, a group common physical downlink control channel communication that identifies a slot format indicator index, for communicating with the network node, associated with the set of slot format indicator parameters; and
- communicating with the network node based at least in part on the slot format indicator index.

15. The method of claim 14, wherein the plurality of sets of slot format indicator parameters identifies at least one of:
- a slot format indicator radio network temporary identifier,
- a downlink control information (DCI) payload size,
- a location of per-carrier information within a DCI payload,
- a slot format combination table,
- a physical downlink control channel common search space, or
- a control resource set associated with the common search space.

16. The method of claim 14, wherein the first communication comprises at least one of:
- a radio resource control communication,
- a medium access control control element communication, or
- a downlink control information communication.

17. The method of claim 14, wherein the second communication comprises at least one of:
- a radio resource control communication,
- a medium access control control element communication, or
- a downlink control information communication.

18. The method of claim 14, wherein the second communication comprises:
- a downlink control information (DCI) communication having a slot format indication DCI format, or
- a DCI communication having a scheduling DCI format and including a field indicating the set of slot format indicator parameters.

19. The method of claim 14, wherein the set of slot format indicator parameters is associated with a bandwidth part (BWP) identifier; and
wherein the second communication comprises:
- a BWP switching communication that identifies the set of slot format indicator parameters based at least in part on the BWP identifier.

20. The method of claim 14, wherein the set of slot format indicator parameters is associated with a set of transmission configuration indicator (TCI) states; and
wherein the second communication comprises:
- a TCI state update communication that identifies the set of slot format indicator parameters based at least in part on the set of TCI states.

21. The method of claim 14, wherein the set of slot format indicator parameters is associated with a synchronization signal block (SSB) identifier; and
wherein the second communication comprises:
- a transmission configuration indicator (TCI) state update communication that identifies the set of slot format indicator parameters based at least in part on the SSB identifier.

22. The method of claim 14, wherein transmitting the second communication that identifies the set of slot format indicator parameters comprises:
- transmitting the second communication that identifies the set of slot format indicator parameters based at least in part on receiving, from the UE, a channel quality measurement report associated with one or more beams of the network node.

23. The method of claim 14, wherein transmitting the second communication that identifies the set of slot format indicator parameters comprises:
- transmitting the second communication that identifies the set of slot format indicator parameters based at least in part on receiving, from the UE, a request for a slot format indicator index associated with the set of slot format indicator parameters,
  - wherein the request for the slot format indicator index associated with the set of slot format indicator parameters is included in at least one of:
    - an uplink control information communication,
    - a medium access control control element communication, or
    - a radio resource control communication.

24. The method of claim 14, wherein transmitting the second communication that identifies the set of slot format indicator parameters comprises:
- transmitting the second communication that identifies the set of slot format indicator parameters based at least in part on receiving, from the UE, an indication of a location of the UE.

25. The method of claim 24, wherein the first communication comprises:
- an explicit indication of the location of the UE, or
- a measurement report associated with a positioning reference signal.

26. A user equipment (UE) for wireless communication, comprising:
- a memory; and
- one or more processors coupled to the memory, the one or more processors configured to:
  - receive, from a network node, a first communication that identifies a plurality of sets of slot format indicator parameters;
  - receive, from the network node and based at least in part on receiving the first communication, a second communication that identifies a set of slot format indicator parameters from the plurality of sets of slot format indicator parameters;
  - identify, based at least in part on the set of slot format indicator parameters, a group common physical downlink control channel communication, transmitted by the network node, identifying a slot format indicator index for communicating with the network node; and
  - communicate with the network node based at least in part on the slot format indicator index.

27. The UE of claim 26, wherein the one or more processors are further configured to:
- identify, based at least in part on the set of slot format indicator parameters, a physical downlink control channel communication that identifies a slot format indicator index for communication with the network node.

28. The UE of claim 26, wherein the one or more processors, to communicate with the network node, are configured to:

communicate with the network node based at least in part on a slot format identified based at least in part on the slot format indicator index.

29. A network node for wireless communication, comprising:

a memory; and one or more processors coupled to the memory, the one or more processors configured to:

transmit, to a user equipment (UE), a first communication that identifies a plurality of sets of slot format indicator parameters;

transmit, to the UE and based at least in part on transmitting the first communication, a second communication that identifies a set of slot format indicator parameters from the plurality of sets of slot format indicator parameters;

transmit, to the UE, a group common physical downlink control channel communication that identifies a slot format indicator index, for communicating with the network node, associated with the set of slot format indicator parameters; and communicate with the network node based at least in part on the slot format indicator index.

30. The network node of claim 29, wherein the one or more processors, to transmit the second communication that identifies the set of slot format indicator parameters, are to:

transmit the second communication that identifies the set of slot format indicator parameters based at least in part on receiving, from the UE, a channel quality measurement report associated with one or more beams of the network node.

\* \* \* \* \*